April 27, 1954 F. G. ELDER 2,676,391
METHOD OF AND APPARATUS FOR SECURING
HOSE FITTINGS TO HOSE ENDS
Filed Dec. 11, 1951 3 Sheets-Sheet 3
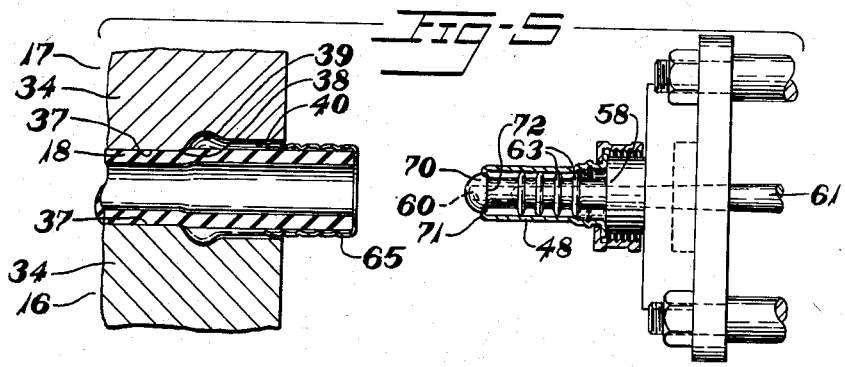
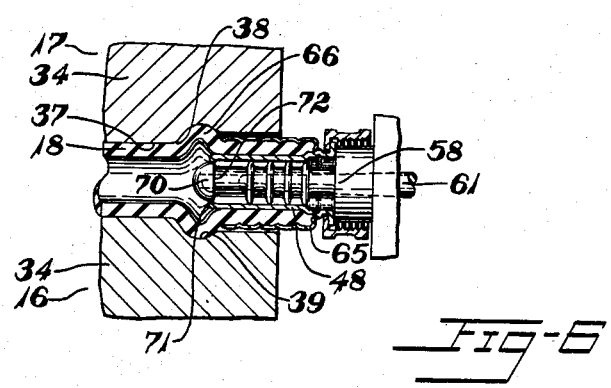
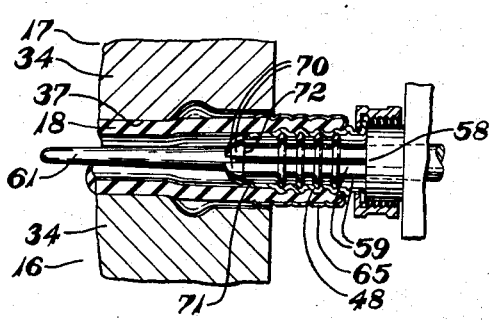
Inventor
Fred G. Elder
By [signature]
Atty.

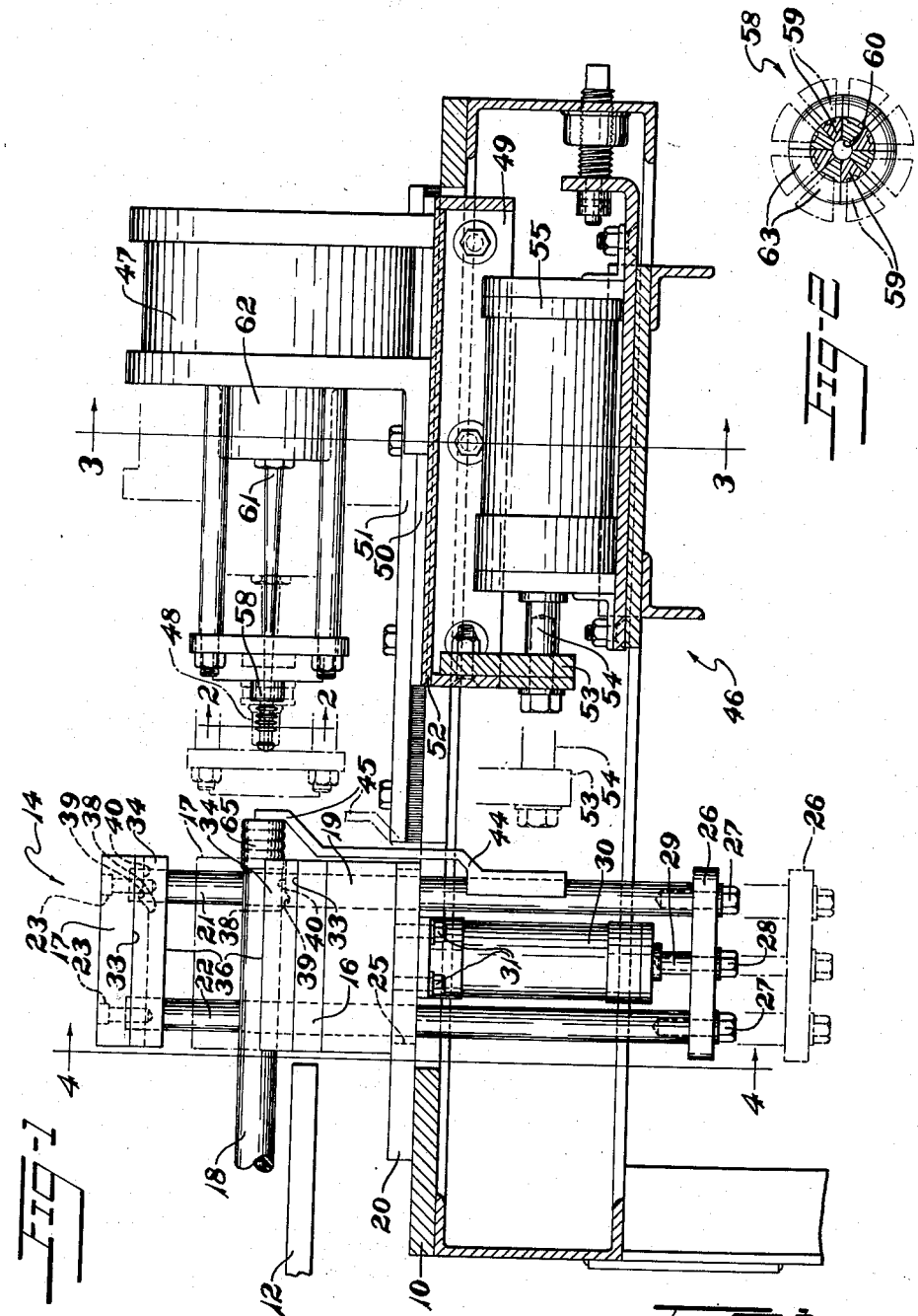

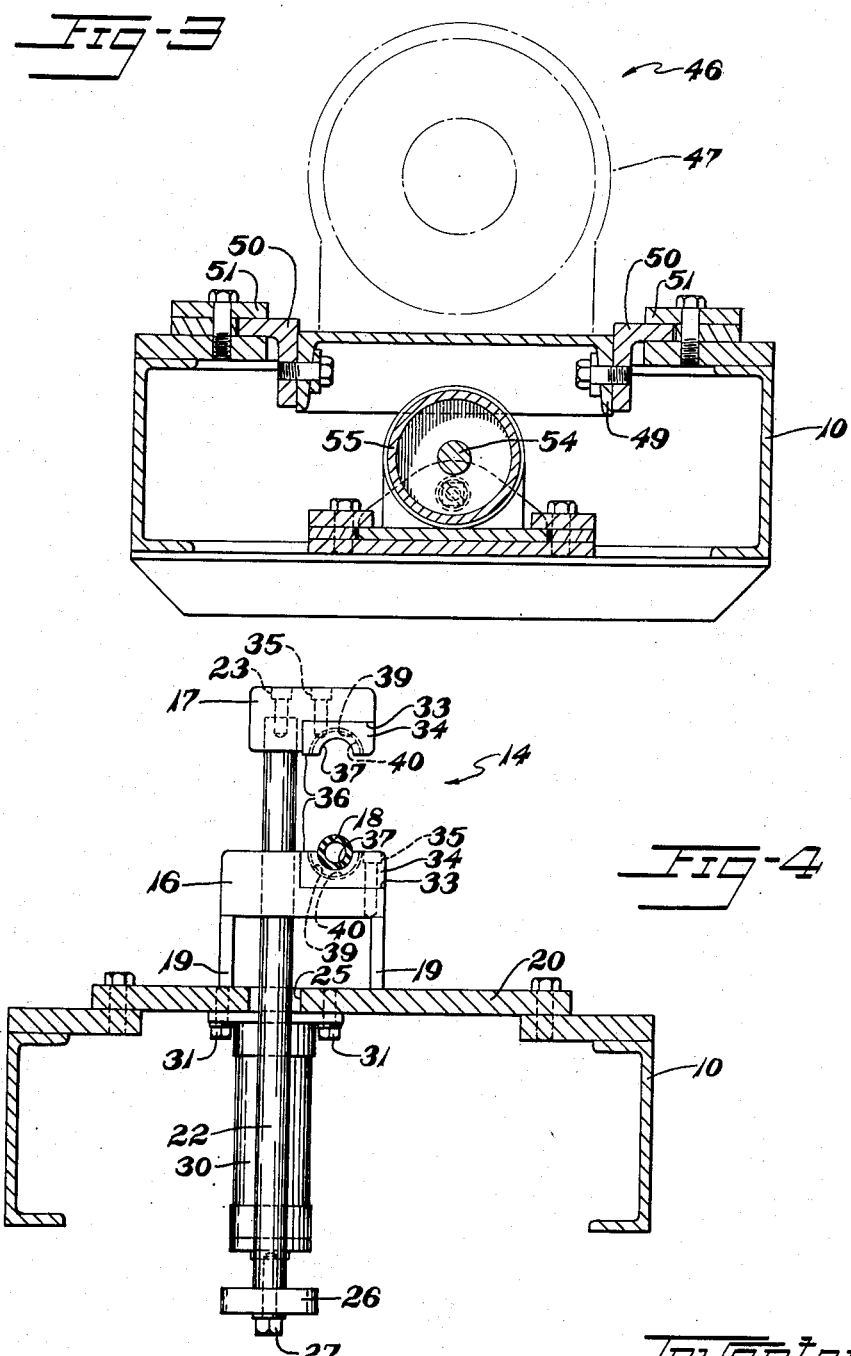

Patented Apr. 27, 1954

2,676,391

UNITED STATES PATENT OFFICE 2,676,391

METHOD OF AND APPARATUS FOR SECURING HOSE FITTINGS TO HOSE ENDS

Fred G. Elder, Atwater, Ohio, assignor to The B. F. Goodrich Company, New York, N. Y., a corporation of New York Application December 11, 1951, Serial No. 261,124

12 Claims. (Cl. 29—148.2)

This invention relates to the manufacture of hose and more especially to the assembling and securing of a coupling or other fitting to the end of a hose.

The ordinary hose coupling or fitting includes a sleeve of ductile metal which fits closely around the outside surface of a hose-end, and another portion having a tubular shank of ductile metal which fits inside the hose-end concentrically inside the sleeve. This assembly may be securely fastened to the hose-end by either expanding the shank or by contracting the sleeve, or both, until the hose-end has been squeezed tightly between them. To prevent the fitting from popping off the hose when the hose is to be used for handling fluids under high pressure, etc., it has been proposed to form the hose with a thicker wall than is ordinarily used on low pressure hose and also to form the internal diameter of the hose smaller than the diameter of the shank so that to assemble the parts of the fitting the shank must be pressed into the hose-end. Prior to this invention, it has been difficult to make this assembly without scarring and gouging the interior and exterior surface of the hose. Various clamping procedures have been proposed heretofore but generally the pressure required to force the shank into the end of the hose has been so great that the hose has been displaced from the clamp during the assembly causing damage to the hose.

It is an object of this invention to provide for holding the hose without damaging it while the shank is pressed axially into the hose-end and secured to the hose. Another object is to provide for bulging the hose outwardly while the shank is being pressed into the hose so that the bulged portion may cooperate with mechanism for holding the hose to prevent axial displacement of the hose during the assembly of the parts of the fitting. Another object is to provide novel apparatus for effecting these operations, the apparatus including clamping mechanism formed with a plurality of elements adapted to fit together in mating relation to apply constrictive pressure to the hose to hold the hose while the fitting parts are assembled and also suitable mechanism for inserting the shank of the fitting into the hose-end. A further and important object of the present invention is to provide for expanding the shank in such a manner that after the assembly has been made the sharp, innermost edge of the shank cannot cut the hose as the hose is flexed in service.

Other features and objects of the invention will be apparent from the following description of the invention in connection with the drawings.

In the drawings:

Fig. 1 is a side elevation, partially in section, showing apparatus constructed according to and embodying the principles of this invention;

Figs. 2, 3 and 4 are views taken on the lines 2—2, 3—3, and 4—4, respectively, of Fig. 1; and Figs. 5, 6 and 7 are views showing the hose-end at various stages during the assembly of the fitting.

As indicated in Fig. 1 the apparatus is formed with a frame structure 10 which is adapted to be supported adjacent the end of a worktable 12. On the end of the frame closest to the worktable 12, there is a hose-clamping mechanism 14 which comprises a lower clamping block 16 and an upper clamping block 17 which are adapted to be brought together to clamp a hose 18 in position to have a fitting assembled on the end of the hose. The lower block 16 is mounted on support members 19 (see also Fig. 4) which are fixed to a flat horizontal plate 20 which covers a portion of the top of the frame 10. The front of upper block 17 is fastened to the top of a vertical rod 21 and the back of block 17 is fastened to the top of another vertical rod 22 by cap screws 23. The rods 21 and 22 are parallel to each other and they extend downwardly through and are slidably supported in the lower block 16 and they also extend through a slot 25 in the plate 20. Below plate 20 the bottoms of these rods are connected together by a crosshead 26 which is secured to the rods by cap screws 27. The center of the crosshead 26 is fastened by screw 28 to the end of a piston rod 29 which projects downwardly from a fluid pressure cylinder 30 fastened by screws 31 to the bottom of the plate 20 midway between the rods 21 and 22. The cylinder is operable to slide the rods 21 and 22 vertically through the lower block 16 to move the upper block 17 toward and away from the lower block.

Along one side of the lower surface of block 17 and the upper surface of block 16 there is a right-angle cutout portion 33. These cutout portions 33 of each block are opposite each other and in each cutout there is a metal insert 34 fastened by a cap screw 35. When the cylinder 30 is operated to bring the blocks 16 and 17 together, the inserts are adapted to contact each other along flat, mating surfaces 36. Each insert has a semi-circular concavity 37 in its surface 36 (see Fig. 4) extending from the back of the insert to a point 38 toward the front of the insert and when the blocks are brought together into mating relation the concavities 37 register with each other to surround the outside surface of the hose snugly and apply radial constrictive pressure on the hose. Each concavity 37 terminates at point 38 by blending smoothly into a recess or groove 39 which is appreciably deeper than the concavity 37 and which is formed concentrically. The recess is relatively narrow and it blends smoothly into another semi-circular concavity 40 which extends to the front of each insert. The concavity 40 has a greater radius than concavity 37 although it is not as deep as the recess 39. When the blocks are together the recesses 39 are adapted to register with each other and also the concavities 40 are adapted to register with each other to define cylindrical enclosures around the hose. The purpose of the recesses 39 and the concavities 40 will be explained in connection with the operation of the apparatus.

The inserts 34 are removably fastened by the screws 35 so that other similar inserts with different sized concavities may be substituted when the apparatus is to be used for processing hose of different sizes.

In Fig. 1 the clamping blocks are shown in solid lines in their open position and the chain-dotted lines show the blocks clamped around a hose 18. To locate the hose properly before it is clamped a gauge 44 is employed which is fastened on the forward vertical rod 21. This gauge has a flat upper end 45 which, when the blocks are apart, is located a fixed distance from the front of the lower guide block 16 so that the end of the hose may be positioned in the concavity 37 of block 16 with the front edge of the hose flat against the end 45 of member 44. Thereafter when the cylinder 30 is operated to lower the block 17 against block 16 to bring the upper insert 34 around the hose, the gauge member 44 is simultaneously moved downwardly away from the end of the hose to the position shown in broken lines by the downward movement of rod 21 to expose or uncover the front end of the hose. The portion of the hose between the point 38 in the clamping blocks and the gauge 44 is referred to hereinafter as the "free length" of the hose. Constrictive pressure is applied to the hose by the clamping blocks only along the concavities 37. From the point 38 to the front of the clamping blocks the hose is unsupported and the fitting is secured to this unsupported or free length of the hose.

At the right end of the frame 10 as shown in Fig. 1 there is located a mechanism 46 for fastening the fitting to the hose. This mechanism includes an expanding tool 47 for supporting the shank portion 48 (see Figs. 1 and 5-7) of a fitting to be fastened to the hose and this tool is mounted on an inverted channel 49 (see Fig. 3) having outwardly projecting angle bars 50 fastened to the flanges of the channel. The angle bars 50 are slidably supported in a track 51 formed along each side of the frame. A portion 52 (Fig. 1) of the channel 49 projects outwardly from the tool 47 between the track 51 toward the clamping mechanism 14 and at the outermost end of portion 52 there is a downwardly extending bar 53 to which is connected the piston rod 54 of a fluid pressure cylinder 55 which is supported inside the frame 10 under the expanding tool 47. This cylinder 55 is thus operable to slide the expanding tool 47 along the track 51 toward and away from the clamping mechanism 14.

Any one of a number of commercially available expanding tools may be used which are well known in the art. The tool illustrated includes a head 58 on which the portion of the fitting having the shank 48 may be supported prior to the operation of inserting the shank into the end of the hose. The head 58 is composed of a number of wedge-shaped blocks 59 which nest together radially as shown in Fig. 2 to form a substantially cylindrical member. The points at which the blocks 59 converge at the axial center of the head define a tapered opening 60 into which the narrow end of a slender, tapered ram 61 is fitted. After the apparatus has been operated to insert the shank 48 into a hose clamped by the blocks 16 and 17, the ram 61 is adapted to be forced axially through the opening 60 by a pressure cylinder 62 to urge the blocks 59 radially outward substantially as shown in Fig. 2. This radial movement expands the shank tightly against the interior surface of the hose-end. The holding or gripping strength of the shank is increased further by the action of a number of small parallel ridges 63 (Fig. 5) which are formed on the circumferential surface of each block 59. These ridges are adapted to bite into the shank as the shank is being expanded and form corrugations which grip the hose-end tightly.

Figs. 5-7 show the condition of the hose at various stages in the operation of the apparatus. The free length of the hose may be fitted with a cylindrical sleeve 65 which fits around its outside surface either before or after the hose is clamped in the inserts 34 between the blocks 16 and 17. When the hose is properly clamped its free length will be axially aligned with the head 58 of the expanding tool 47. The portion of the fitting having the shank 48 is then mounted on the head 58 substantially as shown in Fig. 1 and Fig. 5 and then the pressure cylinder 55 is operated to move the expanding tool 47 toward the hose. Because the internal diameter of the hose is slightly smaller than the diameter of the shank, the shank will encounter resistance as it is pressed against the end of the free length. The pressure required to force the shank completely into the free length is generally so great that the free length will be compressed and will be forced axially into the concavity 40 in the inserts thereby causing the hose-end to bulge out into the recess 39 substantially as shown at numeral 66 in Fig. 6. The diameter of sleeve 65 is somewhat smaller than the diameter of the opening at the front of the inserts formed by the registering concavities 40 so that as the free length is compressed sleeve 65 slides easily into the concavities 40. Preferably the concavities 40 form an opening just sufficiently wide enough to receive the sleeve 65 so that the free length cannot bend appreciably as the shank is being inserted but is held in alignment with the head 58.

The clamping concavities 37 fit sufficiently snugly around the hose to constrict the hose slightly and thereby prevent any axial displacement of the hose in the clamping blocks when pressure is initially applied to fit the tip of shank 48 into the free length. The pressure required to urge the shank completely into the hose, however, might be sufficiently great to cause a slippage of the hose in the concavities 37 if it were not for the fact that the absence of confining resistance at recess 39 together with the pressure applied to the end of the hose causes the free length to bulge out as at 66. This bulged portion 66 cooperates with the concavities 37 to lock the hose firmly in the clamping blocks until the shank has been forced completely into the hose.

After the shank has been pressed into place the hydraulic pressure on the cylinder 55 is released, thereby relieving the axial pressure on the free length. Immediately thereafter the free length straightens, producing a force acting to push the expanding tool 47 away from the clamping mechanism 14. After the hose has straightened itself as shown in Fig. 7 then cylinder 62 is operated to urge the ram 61 of the expanding tool through the opening 60 in head 58 to separate the nested blocks 59 and expand the shank of the fitting tightly against the portion of the hose-end surrounded by the sleeve 65.

An important feature of the invention is in the shape of the head 58 of the expanding tool 47. This feature is the provision of a small projection 70 formed on the outermost end of each block 59 in head 58. (See Fig. 5.) When blocks 59 are nested together the projections 70 fit together to define a knob-like supporting surface for an annular, inwardly turned lip 71 formed at the outer end of shank 48. As shown in Fig. 5 the projections fit tightly under the lip 71 so that when the shank is being inserted into the free end these projections 70 deflect the material of the hose and prevent rubber and other materials of the hose carcass from flowing under lip 71 to cause an obstruction inside the shank and to result in scarring and gouging of the interior surface of the hose.

It is important to note that the projections 70 terminate quite close to the lip 71 by a vertical surface 72 or the like as shown in Fig. 5. Due to the action of the corrugation-forming ridges 63 on the head 58, the shank 48 is shortened in length as it is expanded and if the enlarged portions 70 extended any appreciable distance inside the shank, the portions 70 would press against the lip 71 during the expansion and bend the lip upwardly, leaving the shank with a sharp edge which would cut the interior of the hose as it is flexed in service. Because of the location of surface 72, however, the lip 71 may drop off the projections 70 as soon as the expansion of the shank begins and therefore the shape of the lip 71 is preserved substantially as shown in Fig. 7.

The invention is not limited to the use of the particular tool 47 as shown nor is it limited to the use of a tool which expands a shank. A shank-expanding type tool is preferred, however, since the shank may be inserted and then fastened to the hose in the same operation. It is recognized that other types of equipment may be used to fasten fittings of the hose including tools which contract the sleeve 65, etc. It is also possible to perform the assembly of the coupling on apparatus constructed according to this invention and then transfer the hose to other equipment for fastening the coupling in place.

Variations of the structure may be made within the scope of the claims.

I claim:

1. The method of assembling a fitting to the end of a flexible hose, the fitting having a shank to be inserted inside the end of the hose, which method comprises holding the hose by applying constricting pressure thereto to form a constricted hose portion with a free length projecting from the constricted portion to receive said shank, presenting said shank to said free length of hose in axial alignment therewith, and effecting relative axial movement between said constricted portion and said shank to cause said shank and free length of hose to telescope and bulge said free length of hose outwardly in the region adjacent said constricted portion until the shank is fully inserted into the free length of hose.

2. The method of assembling a hose fitting with the end of a hose, which method includes the steps of supporting a portion of the hose a relatively short distance away from the end to receive the fitting, inserting the fitting axially into the unsupported end of the hose and axially contracting the unsupported portion of the hose by the pressure of the insertion of the fitting to bulge the hose outwardly in the region adjacent the supported portion, and preventing axial displacement of said bulged portion thereby preventing displacement of the hose due to the axial pressure of insertion of the said fitting until the said insertion into the hose end is completed.

3. Apparatus for assembling a fitting with an end of a hose, which fitting includes a shank adapted to be inserted into the hose, the apparatus comprising shank-supporting means, clamping means having a surface for applying constricting pressure to the hose a relatively short distance from the end to which the fitting is to be secured to hold the hose in axial alignment with a shank supported on said supporting means, means for urging said clamping means and said supporting means relatively toward each other to press the shank axially into said hose, and a recess in said clamping means into which a portion of said hose between the constricted portion and said end is adapted to be bulged as the shank is pressed into the end of the hose, said constricting surface of the clamping means blending smoothly into the recess to avoid injuring the hose as it is bulged.

4. Apparatus for assembling a fitting to an end of a hose, said apparatus comprising a clamp having a plurality of elements, means for bringing the elements into mating relation with each other to surround a portion of the hose to receive the fitting, each element having a first concavity adapted to apply constricting pressure on the outside surface of the hose a relatively short distance from the end of the hose and a deeper concavity adjacent said first concavity, said deeper concavities of the elements being adapted to register with each other when the elements are in mating relation to define an annular opening larger than the outer diameter of the hose around a portion of the hose between said constricted portion and said end, the first concavity of each element blending smoothly into the deeper concavity, and means for pressing a fitting axially against said end of the hose to cause a portion of the hose to bulge into the annular opening and thereby cooperate with the clamped portion of the hose to prevent axial displacement of the hose in the clamp while the fitting is pressed into the end of the hose.

5. A clamp for holding a hose while a fitting is assembled with an end of the hose, said clamp comprising a plurality of elements movable into and out of mating relation with each other to surround a portion of the hose adjacent an end thereof, each of said elements having a longitudinal concavity therein adapted to apply constricting pressure on the surface of the hose when the elements are in mating relation, and each of said elements having a second concavity deeper than said longitudinal concavity adapted to register with corresponding concavities of the other elements when the elements are in mating relation to define an opening around the hose larger than the outer diameter of the hose into which a portion of the hose may be bulged while a fitting is pressed into the end of the hose, the longitudinal concavity of each element blending smoothly into said second concavity to avoid injuring the hose as it is bulged.

6. A clamp for holding a hose while a fitting is assembled with the end of the hose, the clamp comprising a first portion having a surface for applying constricting pressure to the hose with a free length of the hose projecting beyond the constricted area, and a second portion surrounding said free length a spaced distance from the surface of the hose to define an opening larger than the outer diameter of the hose into which opening the free length is bulged when the fitting is assembled, the surface of the first portion of the clamp bending smoothly into said second portion to avoid injuring the hose as it is bulged.

7. Apparatus for assembling with the end of a hose a fitting having a sleeve for surrounding the outside end of a hose and having a shank insertable inside the end concentrically of the sleeve, the apparatus comprising shank-supporting means, a clamp aligned axially with the shank-supporting means for holding the hose, and means for moving the shank-supporting means and the clamp axially relative to each other to insert the shank into the hose; the clamping means having a surface for applying constricting pressure to the hose with a free length of the hose and sleeve thereon projecting axially toward said shank-supporting means, and a portion surrounding the free length a spaced distance to define an opening around the free length into which said sleeve is slidable as shank is inserted, and between said portion and said constricting surface a recess surrounding the free length and larger than the outer diameter of the hose, into which recess the free length is bulged as the shank is inserted.

8. The method of holding a flexible hose and inserting a member into the bore of the hose at an end thereof, which member has a diameter greater than the diameter of said bore, comprising applying a radially directed gripping pressure to a region of said hose spaced axially from the end thereof, aligning the member with the bore at the said end of the hose, effecting relative axial movement of said member and said hose in a direction to cause the member to enter the bore and produce radial bulging of the hose intermediate the said region and the adjacent end, and preventing axial movement of the bulged portion of the hose while continuing said relative axial movement until the insertion of said member is completed.

9. In the method of assembling a fitting to the end of a flexible hose, which fitting has a shank adapted to be inserted into the bore of the hose at the end thereof with the outside diameter of said shank being greater than the diameter of said bore, the steps comprising applying a radially directed gripping pressure to a region of the hose spaced axially from the end thereof with the portion of the hose intermediate said region and the adjacent end being free of said pressure, aligning the shank of the fitting with the bore of the said free end of the hose, effecting relative axial movement between said fitting and hose in a direction to engage the latter and said shank thereby causing said shank to enter the bore of said hose and effect radial bulging of a part of the free end of the hose, and preventing axial movement of the bulged part of the hose while continuing said relative axial movement until the insertion of the shank into the bore is completed.

10. The method of securing to the end of a hose a multipart fitting having a sleeve portion for surrounding the outside end of the hose and another fitting portion with a shank adapted to be inserted in the end of the hose concentrically with respect to the sleeve portion, which method comprises holding the hose by applying constricting pressure thereto adjacent to and spaced from one end of said hose, applying the sleeve portion of said fitting to the said one end of the hose, presenting said fitting shank to said one end of the hose in axial alignment with the bore thereof, effecting relative movement between said fitting shank and hose in a direction to cause said shank to enter the bore of the hose and produce radial bulging of the latter intermediate said one end and the region of the constricting pressure, preventing axial movement of the bulged portion of the hose while continuing said relative axial movement until the insertion of said shank is completed, and then radially deforming at least one of said fitting portions thereby squeezing the end portion of the hose between said sleeve and shank portions.

11. An apparatus for securing to an end of a hose a fitting which includes a shank of ductile material adapted to be inserted into the hose end and having an inwardly turned lip at one end of the shank, said apparatus having clamping means including a plurality of elements movable into mating relationship with each other to support a hose for receiving the fitting, a tool for supporting the shank of the fitting, and means for effecting relative axial movement of the tool and said clamping means in a direction to press the shank of the fitting into the end of the hose held in said clamping means, said tool including a radially expansible head supported at one end with the other end free and adapted to enter said fitting and said hose, said head comprising a plurality of elongated radially expansible sections each having a plurality of axially spaced transversely extending ridges on the outer surface adapted to engage the interior of the shank of the fitting and effect a corrugation of the latter when the said sections are expanded, a radial projection on the outer surface of each section spaced from the supported end of said head, the said projections being adapted to support the lip of said fitting when the head is inserted therein, the inner sides of said projections being spaced from said supported end of the head a distance such that the lip of a fitting supported on the projections is adjacent said sides, whereby expansion of said head causes the ridges on said sections to corrugate the shank of the fitting thereby axially contracting the latter so that the lip thereof is moved inwardly of the head from said projections and is not deformed thereby.

12. An apparatus as defined in claim 11 wherein the outer end of each of said projections has an arcuate configuration in axial cross-section whereby the said projections cooperate with the lip of a fitting supported thereon to facilitate entrance of the head and a supported fitting into a hose without displacement of material of the hose under said lip as the head and fitting are inserted into the hose.

References Cited in the file of this patent

UNITED STATES PATENTS

| Number | Name | Date |
| --- | --- | --- |
| 1,848,867 | Callaway | Mar. 8, 1932 |
| 1,945,777 | Heidloff | Feb. 6, 1934 |
| 2,060,860 | Flynt | Nov. 17, 1936 |
| 2,258,919 | Wallace | Oct. 14, 1941 |